July 6, 1965 C. AGRATI 3,192,543
AUTOMATIC NUT TAPPING MACHINE
Filed Dec. 10, 1962 6 Sheets-Sheet 5
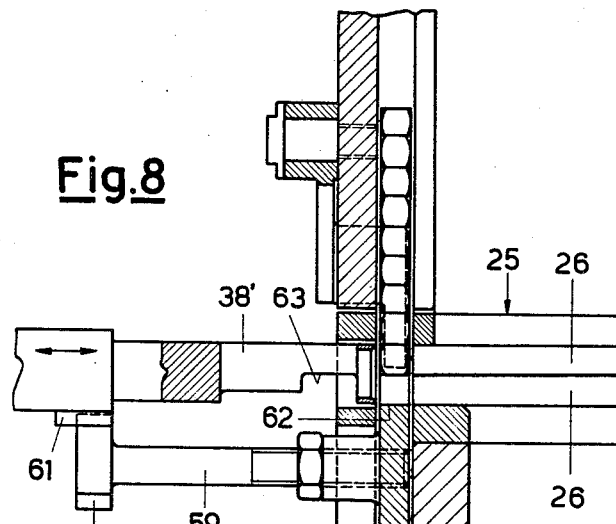
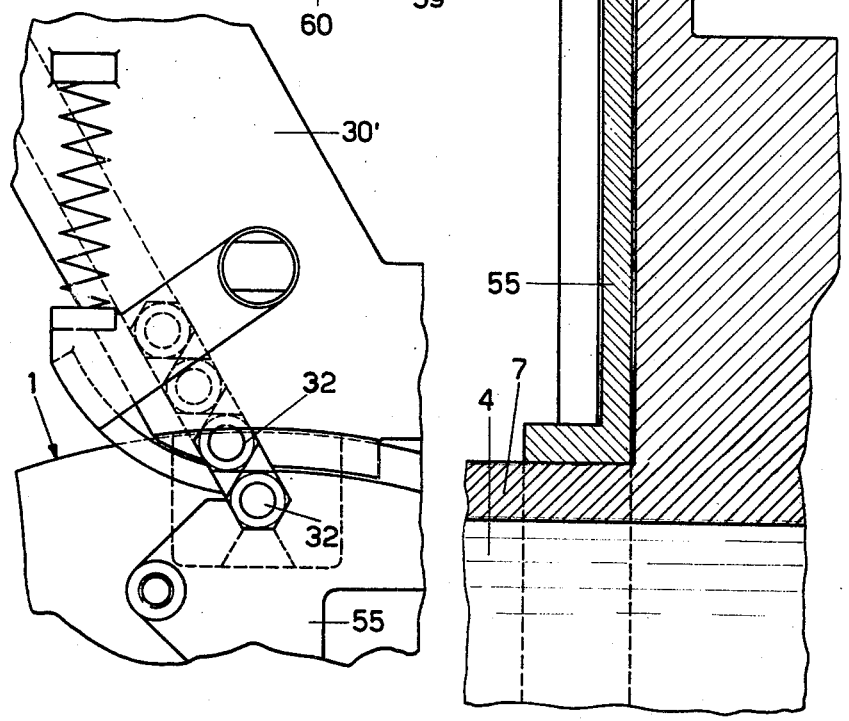
INVENTOR
Carlo Agrati
BY Stevens, Davis, Miller & Mosher
ATTORNEYS

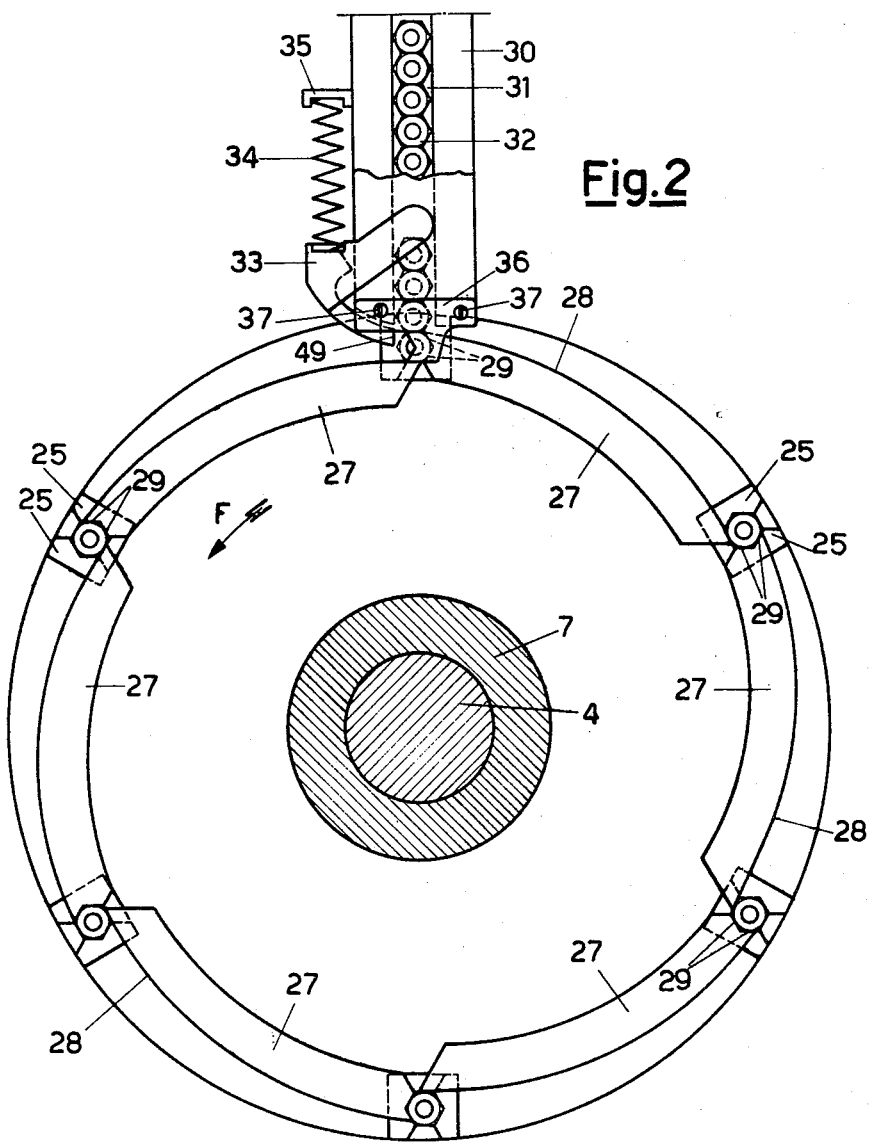

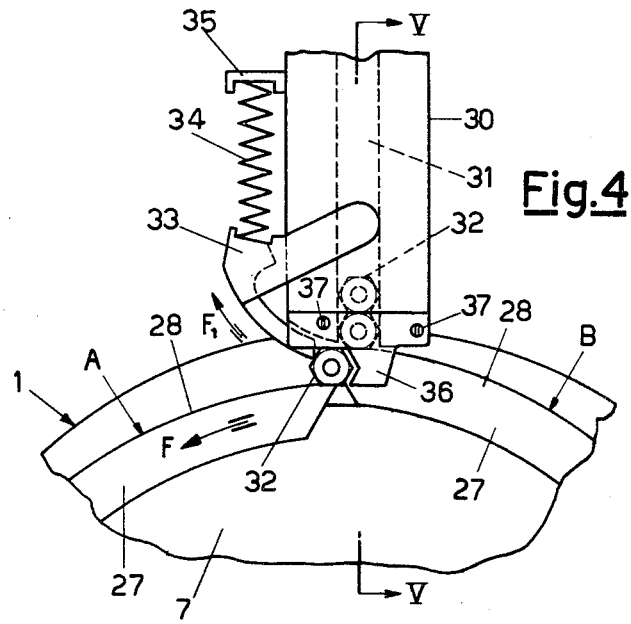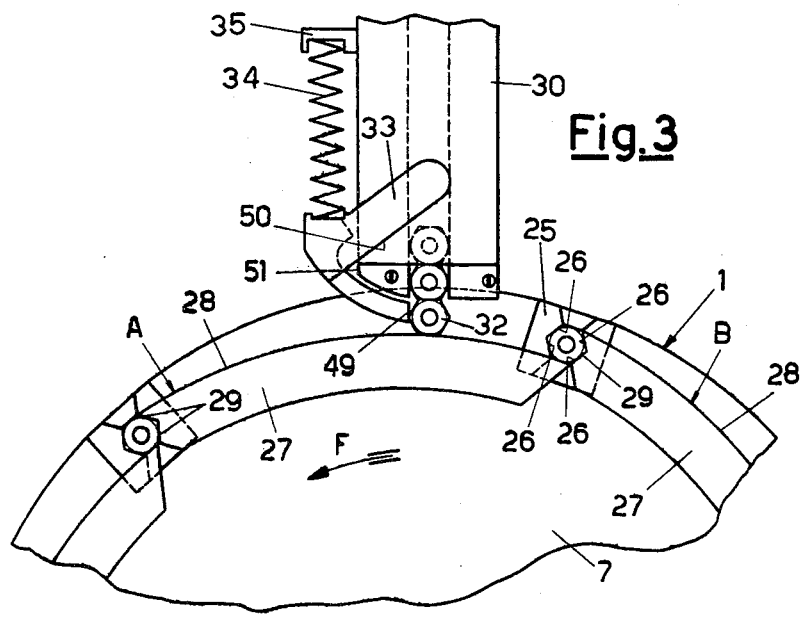

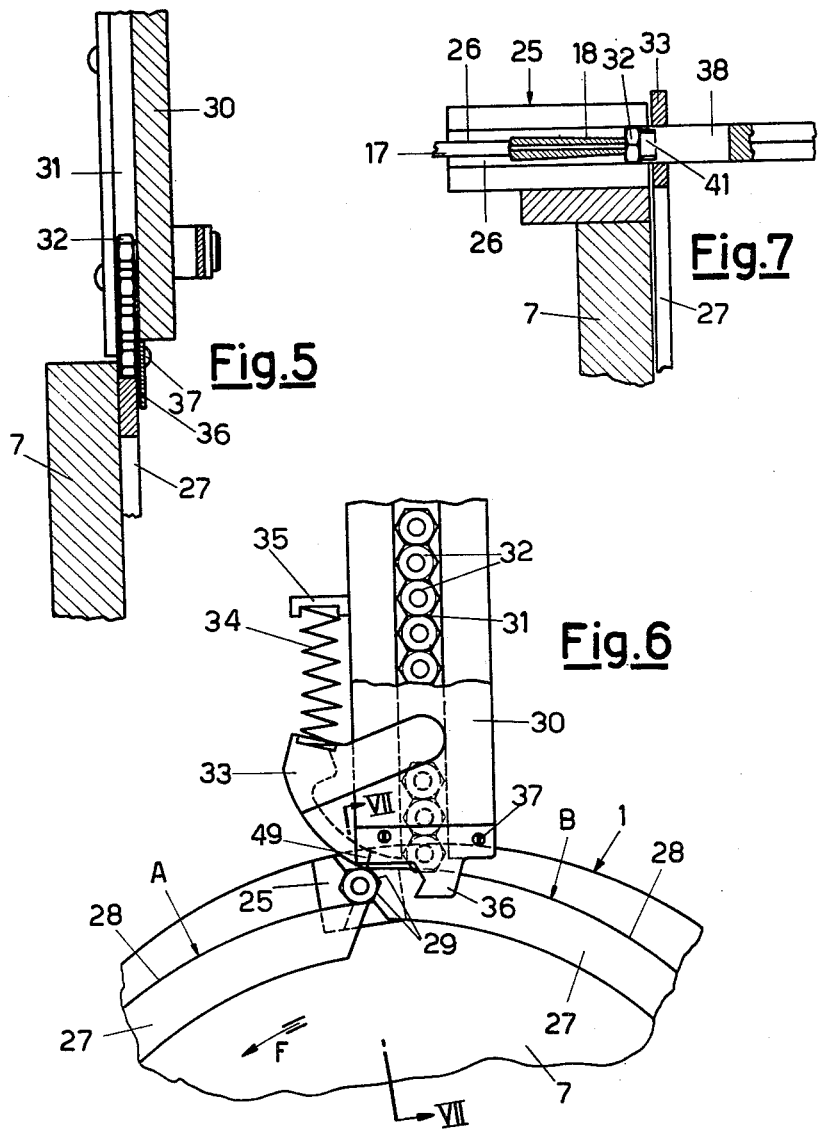

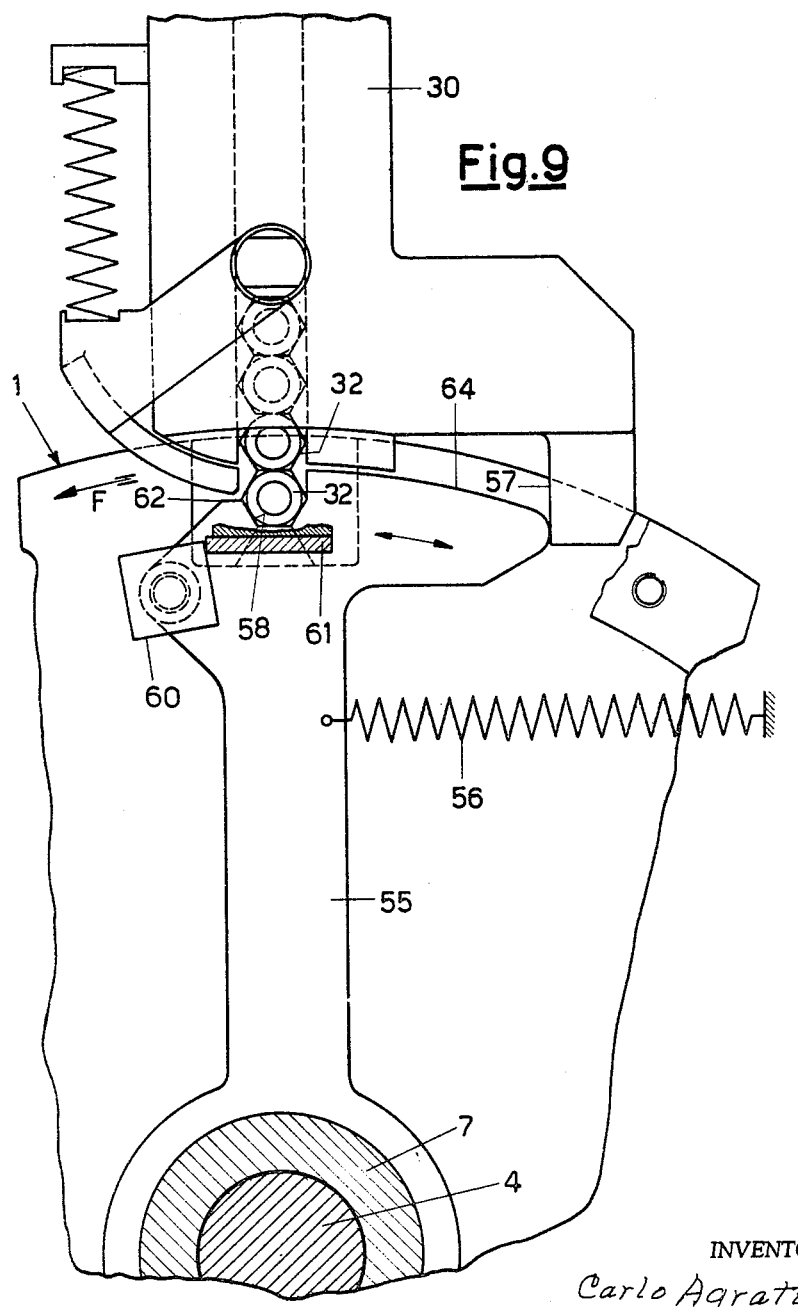

United States Patent Office 3,192,543
Patented July 6, 1965

3,192,543
AUTOMATIC NUT TAPPING MACHINE
Carlo Agrati, Veduggio Brianza, Italy, assignor to Officine Meccaniche A. Agrati S.r.l., Veduggio Brianza, Italy, a company of Italy
Filed Dec. 10, 1962, Ser. No. 243,404
Claims priority, application Italy, Dec. 14, 1961, 663,028
10 Claims. (Cl. 10—132)

This invention relates to an automatic nut tapping machine.

The main object of the present invention is to provide a machine capable of carrying out simultaneously a plurality of tapping operations, having a single feeding duct for the nuts to be tapped, or threaded, which after the completion of the tapping operation are collected in a suitable container.

In carrying out a series of operations simultaneously on the said nuts supplied from the feeding duct, a considerable economy of time and labour is achieved in comparison with tapping machines of types known heretofore.

The automatic nut tapping machine of this invention is characterized by the fact that it includes a rotating drum which carries a plurality of devices disposed circumferentially around the drum axis, and angularly equidistant, each capable of carrying out by means of a relative tool the tapping of the nuts by means of rotation and axial shifting of the nut relative to the tool, there being provided one single feeding duct for nuts to be tapped, disposed above the drum in a stationary position, adjustable if necessary, with respect to the base, and means which allow, when one of the said devices during the rotation of the drum passes in front of the nut-feeding duct, to set the nut to be tapped, coming from the said duct, in the true centering position with respect to the tool of this device, so that tapping of the nut may be carried out by means of the said device, and there being provided means of controlling the tapping devices so that each device, as soon as it receives a nut from the feeding duct, will carry out the tapping and then return to a condition in which it is able to receive another nut to initiate then the tapping when, after one rotation of the drum, the device passes again in front of the feeding duct.

In order to show the characteristics and the advantages of the machine of the present invention, a description will be given of one example of its embodiment, to be taken in connection with the accompanying drawings in which:

FIG. 2 is a cross-sectional view taken along the line II—II of the FIG. 1. In this FIG. 2 for greater simplicity some parts have been omitted and certain parts are shown in a determined phase of the working cycle.

FIG. 3 shows a detail of the FIG. 2 but with the parts in a different phase of the working cycle.

FIG. 4 shows a similar detail as on FIG. 3 but with the same parts in a successive working phase.

FIG. 5 is a cross-sectional view taken along the line V—V of FIG. 4.

FIG. 6 shows a detail similar to those on FIGS. 3 and 4 but with the same parts in a further phase of the working cycle.

FIG. 7 is a sectional view taken along the line VII—VII of FIG. 6.

FIG. 8 shows a detail relative to a modification of the embodiment of the machine.

FIG. 9 shows the same detail but seen at 90° with respect to the FIG. 8.

FIG. 10 shows a detail relative to a further modification of the machine.

Figure 1:
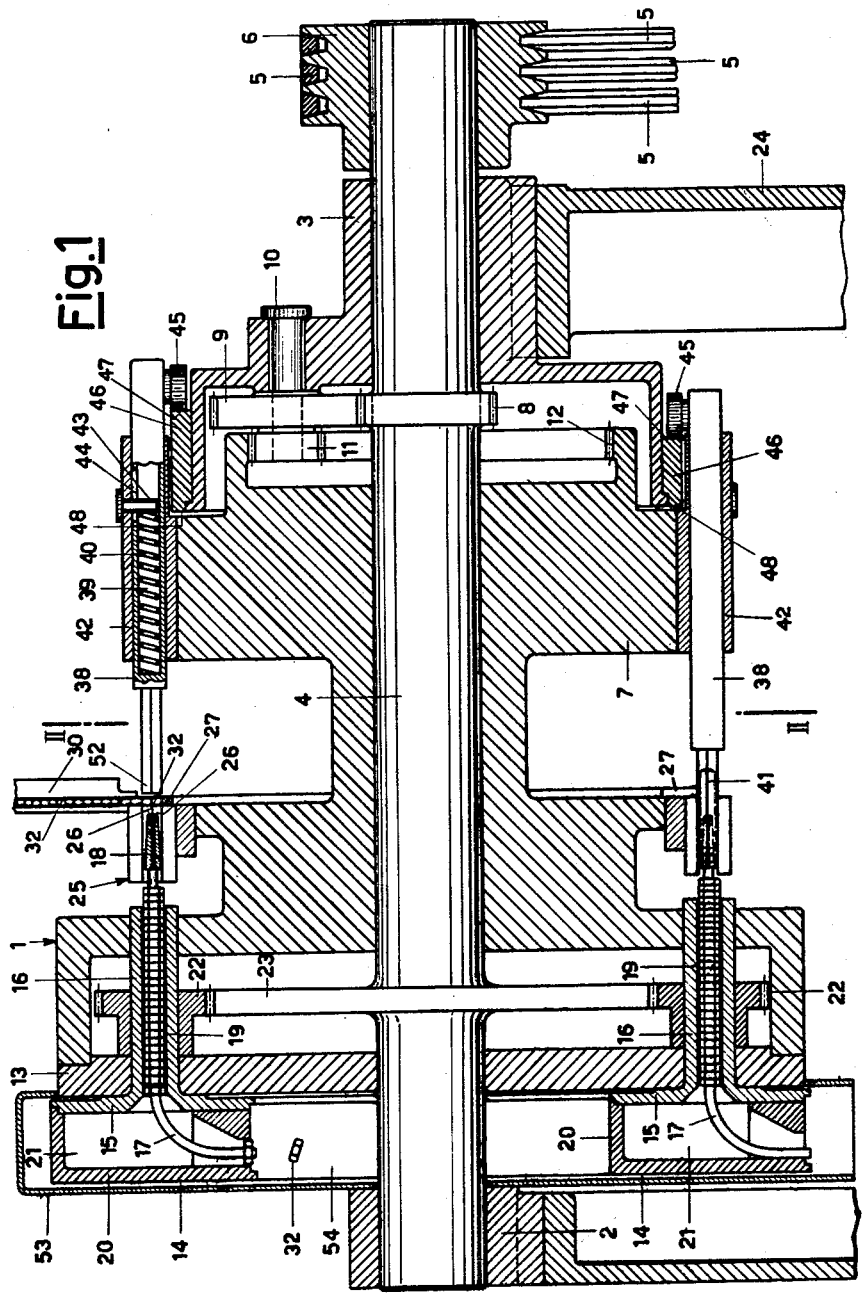
FIG. 1 is a sectional view of the machine in a vertical plane passing through the axis of the main shaft driven by the motor.

The machine of the invention comprises a base 24 carrying two supports 2 and 3 for the shaft 4. Said shaft, which forms the main shaft of the machine, is driven by a motor (not shown) by means of a belt 5 and a pulley 6 so as to be able to rotate in the supports 2 and 3 about its own axis.

A drum 1 is rotatably fitted on the shaft 4. The drum includes the body 7 and a member 13 being an integral part of the said body 7. The drum carries a plurality of parts capable of carrying out the tapping (threading) of the nuts, as will be explained hereafter. A gearwheel 8, fitted on the shaft 4, meshes with a gear 9 whose shaft 10 is supported by the support 3; a pinion 11 integral with the gear 9 may rotate around its own axis and meshes with the gear 12, cut in the body 7.

As seen from FIG. 1 the ratios of the gear transmission are such that the angular speed of the body 7 and of the drum 1 is substantially lower than the speed of shaft 4.

To carry out the tapping or threading of nuts (previously drilled) a series of spindles 14 is provided supported by the drum 1, each spindle capable of rotating around its own axis; in the present example there are six spindles, spaced angularly at equal distances. The number of spindles may be larger or smaller than six.

Each spindle 14 comprises a body 15 onto which is applied a removable member 20.

The body 15 comprises a cylindrical portion 16 which passes through a hole in the member 13 of the drum and may rotate inside said hole, thus the said body 15 may rotate relatively to the drum, around the axis of the said portion 16. The portion 16 has a longitudinal hole 19 co-axial with the said portion 16.

In the hole 19 is located the rectilinear portion of a tool 17, whose terminal portion 18 forms the proper tool viz. the tap for carrying out the threading. A curved portion of the tool 17 is located in the recess 21 of the body 15 and its end comes in contact with the body of the spindle, the rotation of which causes the rotation of the tool around the axis of the portion 16 i.e. around the axis of the rectilinear portion of the tool 17.

Integral with the cylindrical portion 16 of the spindle is a gearwheel 22 which meshes with a gear 23 integral with the shaft 4.

There are thus 6 satellite gears round a single central gear. Since, as seen previously, the drum 1 rotates at a speed lower than that of the shaft 4, the axis (geometrical axis) of each portion 16, being integral to the drum, also rotates around the axis of shaft 4 with the said speed, lower than that of the shaft 4, and thus each spindle, besides rotating with the drum, rotates also with considerable speed around said axis of the portion 16.

Corresponding to each spindle 14, there is provided a nut guide means capable of holding the nuts during the tapping, and preventing the said nuts from rotating.

The said means comprises 2 members 25 symmetrical to each other, in relation to a plane passing through the axis of the shaft 4 and both integral with the body 7, and hence with the drum 1.

The nut is held and guided without rotating since it is located between the walls 26 of the members 25; said walls (2 for each member 25) match the polygonal profile of the nut and form a passage co-axial with the hole 19.

Integral with drum 1 is a cam consisting of sectors, and precisely in this case a cam comprising 6 sectors 27 equal to each other, the number of sectors being equal to the number of spindles 14.

Each sector 27, which itself is a cam, includes a sliding surface 28 whose generating lines are parallel to the axis of shaft 4, and are situated at a variable distance from the said axis: said generating lines, when following surface 28 in one direction, approach with continuity the said axis.

The width of each surface 28, i.e. its dimension in the direction of the drum-axis, corresponds to the thickness of the nut 32, that is, to the dimension of the said nut, in the direction of its own axis. Each sector of the cam 27 in correspondence to its end furthest from the drum 4 axis terminates in a jaw portion composed of two flat portions 29, matching exactly the two adjacent sides of the nut 32.

The two surfaces 29 are coplanar respectively to the two surfaces 26 of one of the members 25.

To feed the nuts for tapping there is a provided a container member 30, fixed with respect to the base 24 in a vertical position; inside the member 30 there is a vertical conduit 31, along which the nuts 32 descend from a hopper (not shown). The vertical projection of the conduit 31 falls on the surfaces 28, which run underneath the said conduit.

A holding finger 33, subjected to the action of the spring 34, is pivoted to the member 30, said spring 34, reacting between the finger 33 and a support 35 integral with member 30, urges continuously the finger in a downward direction.

A shaped plate 36, capable of preventing the falling out of the nuts, is secured to the member 30 by means of screws 37.

The drum 1 carries devices for advancing the nuts during tapping; in the present example there are 6 devices, each corresponding to a spindle.

Each device comprises a nut advancing element 38, possessing two recesses 39 and 41, recess 39 containing a spring 40 while recess 41 in the tip portion of plunger 38 is adapted to receive the tapping portion 18.

Each element 38 may move axially in its proper guide, made in a member 42, integral with the body 7 of the drum; said element 38 being co-axial with the hole 19 of the corresponding spindle.

The spring 40 reacts between the element 38 and a pin 43, built into the member 42, urging the element 38 towards the spindle. Said pin 43, in order not to hinder the free movement of the element 38, passes through a slot 44 in the said element.

The element carries a roller 45, constantly in contact with the surface 47 of a cam composed of an annular body 46, co-axial with the shaft 4 and fixed to the body 3 and hence to the base 24.

The body 46 comprises a surface 48, which lies in a plane perpendicular to the axis of shaft 4. On following surface 47 through a rotation of 360°, it will be observed that the distance of the said surface 47 from surface 48 is variable, hence it is the surface 47 which forms the actual cam, which engages the rollers 45 and thus moves the elements 38.

During the rotation of the drum 1, each of the 6 rollers 45 runs on the surface 47 of the fixed member 46. When the roller 45 reaches a point of the said surface 47 of minimum distance from the plane of the surface 48, the element 38, urged by spring 40, will be in the most advanced position towards the corresponding spindle 16, and the tapping portion 18 will be inside the recess 41.

For example let us consider a complete revolution of the drum 1, starting from the said position: during this rotation the roller 45, engaging at first that part of surface 47, whose distance from the reference plane 48 progressively increases, will retract thus driving the element 38 away from the spindle, against the action of spring 40 which becomes compressed; subsequently, as surface 47 approaches surface 48, the element 38 may approach the spindle under the action of spring 40. At the end of a complete revolution, the element 38 will return to the position in which the said element contains the portion 18.

A description will now be given of the operation of the machine of this invention.

Each spindle is initially "loaded," i.e. some nuts are threaded on the tools 17, in order to keep the tool in the correct position. To carry out said operation, the number 20 is first removed and then replaced. Let us suppose that the machine is in operation: the shaft 4 receives rotational movement from a motor through the belt 5 and pulley 6, and hence through the gears 8, 9, 11 and 12 it transmits the movement to the drum 1, which rotates at a speed lower than that of shaft 4. The axes of portions 16 rotate, together with the drum 1, around the axis of shaft 4; furthermore the 6 spindles will receive rotational movement through the gear 23 and the satellites 22, each spindle rotating around the axis of its own portion 16.

Let us consider a working cycle starting from a given moment, e.g. from the moment corresponding to FIG. 3 where a nut to be tapped, previously lowered from the pile contained in conduit 31, lies on surface 28 of the sector 27, which just at this moment runs under said pile (see FIG. 3 in which the sector in question is marked with the letter A). The point on said surface on which the nut lies (see FIG. 3), is at a certain distance from the flat surfaces 29 of the next sector 27 (marked with the letter B), which in that moment advances towards the bottom of conduit 31. The drum 1, when looking at the FIGS. 2, 3, 4 and 6, rotates in the direction of the arrow F.

The end 49 of the finger 33 abuts against a side of the nut lying on the surface 28, thus preventing the nut from being dragged along by this surface towards the left (looking at FIG. 3); thus this surface moves under the nut which itself remains stationary.

The side 50 of the finger 33 touches (see FIG. 3) the edge 51 of the member 30, and therefore the said finger, although urged downwards by the spring, cannot rotate beyond that position.

The finger 33 serves also to give a better positioning to the nut. When, at a certain moment, the walls 29 of the next sector 27 (marked with letter B) arrive to touch the corresponding sides of the nut, the latter is now pressed by the walls 29 against the end 49 of the finger 33, which in its turn resiliently due to spring 34, urges the nut against the walls 29 thus ensuring the exact positioning of the nut.

Beginning from this moment, due to the action of the walls 29 of the sector 27 (marked with the letter B), the finger starts to rotate lifting itself.

The element 38, which was in a retracted position with respect to the spindle in correspondence to which the nut being considered has settled in a position for centering, advances under the action of spring 40 as far as the surface 47 of the fixed cam allows.

The end 52 of the element 38 pushes the nut (which is centered by the walls 29 in co-operation with the finger 33) so that said nut enters between the surfaces 26 where it meets the portion 18 of the tool, i.e. the tap. In this manner the tapping will initiate.

In the meantime the finger 33, after rotating through a certain angle in the direction of arrow $F_1$ (see FIG. 4), lifts itself against the action of the spring 34 and at a certain moment becomes free and rotates, under the pressure of said spring, in the direction opposite to arrow $F_1$, and its end 49 comes in contact with the surface 28 of a new sector 27 which is advancing (sector marked with letter B, see FIG. 6). Following said new sector, the end of the finger will meet a new nut, which will drop from the pile upon the advancing sector, the nut previously considered having moved away from underneath the pile of nuts in the conduit 31.

Let us return now to the nut for which, as said before, the tapping was started. The element 38 continues to advance (spring 40 presses and the cam 47 allows advancement); thus the element 38 continues to push the nut which advances upon the tap 18 and, as said nut is held and guided by the walls 26 of members 25 it can only move axially without rotating, while in its hole the tool 18, which does not move axially, rotates effecting the tapping.

The steady and progressive advancing upon tap 18 of the nut, in accordance with the pitch of thread of the nut itself, is ensured by the profile of the cam 46, viz. by the surface 47. The tap carries out the threading by rotating at the maximum cutting speed allowed.

In the relative motion between the portion 18, i.e. the tap, and the element 38, the portion 18 enters the recess 41 (see FIG. 1, bottom). At the end of the tapping process, corresponding to the limit of travel of the element 38, the threaded nut joins the row of nuts on the tool 17.

Obviously as one by one the threaded nuts reach the shank of the tool (each spindle carries out the threading of one nut per each revolution of the drum), the nuts descend along the curved portion of said shank of the tool 17. As soon as a nut reaches the curved portion of the tool, it is expelled by centrifugal force from the spindle and drops into the space 54 of the carter 53, from the bottom of which it will then drop into a collecting box (not shown).

Coming back to the moment of the working cycle when the element 38 under consideration reached the minimum distance from the spindle, and the tapping process has terminated, the said element 38 will now gradually move away from the spindle due to the surface 47.

If one considers one spindle with the corresponding element 38, it will be seen that during one cycle (a cycle corresponds to one complete rotation, i.e. through 360°) the spindle carries out the tapping of one nut. In fact, at each revolution of the drum, a given sector 27 (e.g. the sector A) passes once underneath the loading device i.e. under member 30, thus receiving one nut from the conduit 31; also during a complete revolution of the drum element 38 goes through a complete to and fro travel.

Element 38, as seen previously, pushes the nut when this has settled, centering itself perfectly, against the surface 29 of a sector 27 (sector B, if the sector on which the nut rests is the sector A), advances during tapping and subsequently retracts until it reaches the maximum distance from the spindle. When a new nut will have settled in correspondence to the same spindle being considered, i.e. a complete cycle after the settlement of the nut which previously reached the walls 29 corresponding to that spindle (walls 29 of sector B in the case considered), element 38 will act once again as described heretofore.

As there are 6 spindles (in the example considered), and also 6 sectors 27 and 6 elements 38, at each revolution of the drum 6 nuts will be threaded.

In fact, for example, if we consider the drum at an instant in which one spindle begins the tapping process, having just passed in correspondence to the conduit 31, just at that moment in the other 5 spindles there are 5 nuts in progressively advanced stages of tapping; after a complete cycle, i.e. after the drum has completed a full revolution beginning from said moment, 6 nuts are progressively discharged and, in the meantime another 6 nuts, having descended one by one from the conduit 31, are brought to the same initial conditions as explained heretofore, i.e. one nut in the initial stage of tapping, and the other 5 in progressively advanced stages of the same process.

In the example of the embodiment shown in FIGS. 8 and 9, a modification is introduced insofar as instead of the sector 27 there is a lever 55 pivoted to the body 7 coaxially of the shaft 4. Also in this case there is one drum with six spindles and the relative pushing elements; said elements differ in some details from those previously described, as will be seen hereafter.

A spring 56 secured to the said lever 55 and to a point fixed in relation to the base, tends to keep said lever stationary against a wall 57, also fixed with respect to said base. A shaped seat 58 of the lever is adapted to contain a nut.

The pushing element (one for each spindle, as in the previous example) is in this case indicated by 38'. During the rotation of the drum a pushing element 38' and consequently the related spindle pass into alignment with nut 32, located within the seat 58, at the moment when the nut is exactly centered with respect to the spindle, the pushing element 38', which advances towards the nut to be tapped, abuts with its portion 61 against a member 60, integral with a rod 59, which in its turn is fixed with respect to the lever 55. In this manner lever 55 follows the rotation of the drum, causing lengthening of spring 56. When the portion 61 during the advancement of element 38 in a longitudinal direction leaves the member 60, the lever 55 returns against the fixed wall 57 due to the action of spring 56.

In the meantime however, the end of element 38' begins to push the nut in between walls 26, against the tool (not shown) provided for the tapping process.

Lever 55 ensures that the nut retains its centered position with respect to the walls 26, just as the element 38' begins to push the said nut. Subsequently, when the lever 55 comes back after being freed from portion 61 (the surface 62 of the lever passes underneath the surface 63 of the element 38') the nut has by now entered between the walls 26.

A new nut coming from the pile comes to rest on the surface 64 of the lever and when the latter returns, the nut drops into seat 58. In the example of FIG. 10, which includes a lever like that of FIGS. 8 and 9, there is a modification consisting in the body 30', containing the nuts, which body in this case is inclined in order to guide the nuts themselves.

The nuts in fact, in the case of FIG. 10, are in contact with the walls of the body 30', by their sides, while in the case of FIGS. 8 and 9 contact takes place by the corners.

I claim:

1. An automatic nut tapping machine comprising a stationary support structure, a shaft rotatably supported by said support structure, a drum journalled on said shaft for rotation relative thereto a driving means connected to said shaft for rotating said shaft, said shaft being drivingly connected to said drum for rotating said drum relative to said shaft, a spindle mounted on said drum for revolving about said shaft, said spindle also being rotatably mounted on said drum for rotation about an axis which is parallel to the rotational axis of said shaft, said shaft being drivingly connected to said spindle for rotating said spindle about its rotational axis in the same direction as said drum is rotated by said shaft, a tapping tool connected to said spindle for rotation therewith, a nut guide means comprising a nut holder fixedly attached to said drum in axial alignment with said tapping tool, a plunger mounted on said drum for linear movement along an axis in alignment with the rotational axis of said tool, a nut feeding device arranged between said tool and said plunger.

2. An automatic nut tapping machine comprising a stationary support structure, a shaft rotatably supported by said support structure, a drum on said shaft for rotation thereon, a driving means connected to said shaft for rotating said shaft, a spindle mounted on said drum, said spindle being rotatably mounted on said drum for rotation about an axis which is parallel to the rotational axis of said shaft, means drivingly connected to said spindle for rotating said spindle about its rotational axis, a tapping tool connected to said spindle for rotation therewith, a nut guide means for guiding a nut on said tapping tool, a nut advancing means for urging a nut axially along said tapping tool, a nut feeding device for feeding a nut to said tapping tool, wherein said nut feeding device comprises a stationary nut container adapted to hold a plurality of nuts, an outlet opening in said container adapted to permit passage of said nuts therethrough, said guide means comprising a guide cam, said guide cam comprising a sliding surface which travels past said outlet opening when said drum rotates, said sliding surface being adapted to receive a nut thereon from said outlet opening, said guide cam comprising a jaw portion located at one end of said sliding surface and positioned so as to be able to receive and grip a nut which is sliding on said sliding surface while said drum is rotating.

3. The machine of claim 2, wherein said nut feeding device comprises a resilient biasing means biasing a holding element to a position whereat a portion of said element lies in the path of said jaw portion when said drum is rotating, in said position said portion being adjacent to said outlet opening and to one side thereof so as not to obstruct discharge of nuts from said outlet opening, said one side being the side of said opening furthest from said jaw portion in the direction of rotation of said drum, said holding element being movable against said biasing element to a position whereat said portion lies out of said path of said jaw portion.

4. The machine of claim 2, comprising a plurality of said spindles symmetrically mounted on said drum, a separate said tapping tool, nut guide means, and plunger being provided for each of said spindles, said guide cam comprising an elongate sector for each of said spindles, said sectors being arranged end to end symmetrically around said drum axis, the radially outward periphrey of each sector comprising a separate said sliding surface, one end of each sector comprising a separate said jaw portion, each of said sliding surfaces being arcuate in form and curving radially inwardly from one end to the opposite end of said sector, said one end corresponding to said jaw portion end of said sector, said sliding surface at said opposite end of said sector meeting the adjacent jaw portion of an adjacent sector generally at the radially inwardmost limit of said jaw portion, said outlet opening in said nut container being located so that when said drum rotates, said sliding surfaces will travel past said opening, said sliding surface being configured so that at said one end of said sector it passes in close proximity to said opening and at said opposite end of said sector it is spaced from said opening a distance equal to the width of a nut to be tapped.

5. The machine of claim 2, said guide cam comprising the free end of a lever freely rotatably mounted relative to said drum and said shaft, a resilient means biasing said lever to a position whereat said jaw portion is aligned with said outlet opening, said rotating drum comprising an abutment element which rotates with said drum, said abutment element being arranged on said drum so that it abuts and urges said lever to rotate against the bias of said resilient means when said drum is rotating, said abutment element initially abutting said lever when said spindle is axially aligned with said jaw portion in the biased position of said lever, said abutment element disengaging from its abutment relationship with said lever after said lever has rotated a predetermined distance away from said biased position.

6. The machine of claim 5, comprising a plurality of said spindles symmetrically mounted on said drum, a separate nut tapping tool, nut guide means, plunger, and abutment element being provided for each of said spindles, each said abutment eleement successively abutting said lever, as above-described, each time a corresponding spindle is axially aligned with said jaw portion in said biased position of said lever.

7. The machine of claim 1, wherein said spindle comprises a cylindrical portion which is rotatably mounted on said drum, said cylindrical portion comprising a central hole, said tapping tool comprising a rectilinear portion centrally mounted within said hole, a tap mounted on one end of said rectilinear portion and located within said nut holder, said hole being of a size so as to permit free axial movement of nuts moving over said total rectilinear portion and through said hole.

8. The machine of claim 7, wherein said tool comprises a curvilinear portion extending from one end of said rectilinear portion opposite to the end attached to said tap, said spindle comprising a radially extending flange attached to one end of said cylindrical portion, a cover fitted onto said flange, said flange and cover forming a hollow body fixedly attached to said cylindrical portion, said curvilinear portion contacting said body whereby rotation of said spindle will rotate said tapping tool.

9. An automatic nut tapping machine comprising a stationary support structure, a shaft rotatably supported by said support structure, a drum journalled on said shaft for rotation relative thereto, a driving means connected to said shaft for rotating said shaft, said shaft being drivingly connected to said drum for rotating said drum relative to said shaft, a spindle mounted on said drum, said spindle being rotatably mounted on said drum for rotation about an axis which is parallel to the rotational axis of said shaft, said shaft being drivingly connected to said spindle for rotating said spindle about its rotational axis, in the same direction as said drum is rotated by said shaft, a tapping tool connected to said spindle for rotation therewith, a nut guide means for guiding a nut on said tapping tool, a nut advancing means for urging a nut axially along said tapping tool, and a nut feeding device for feeding a nut to said tapping tool.

10. An automatic nut tapping machine comprising a stationary support structure, a rotatable driving shaft mounted for rotation on said support structure, a drum mounted for rotation about said shaft, a plurality of axially orificed spindles mounted for rotation on said drum in a circle concentric with respect to the drum axis, each of said spindles containing a tapping tool coaxial with the spindle and rotatable therewith, a pinion mounted coaxially on each of said spindles and rigidly fixed thereto, a plurality of plungers mounted on said drum for linear movement along the axis of all of said spindles, a stationary nut feeding device for feeding a nut to each of said spindles at every revolution of said drum, a stationary cam for actuating each of said plungers at every revolution of said drum, gear means connecting said driving shaft to said drum to rotate said drum at a speed lower than the speed of said shaft and gearing means connecting said driving shaft to all of said pinions for rotating said spindles with continuous unidirectional velocity during a complete 360 degree rotation of said drum, said gearing means rotating said spindles in the same direction as said gear means rotates said drum.

References Cited by the Examiner

UNITED STATES PATENTS

| | | | |
|---|---|---|---|
| 1,113,444 | 10/14 | Johnston. | |
| 2,802,224 | 8/57 | Hillman | 10—132 |
| 3,031,700 | 5/62 | Conner | 10—182 |

ANDREW R. JUHASZ, *Primary Examiner.*